US009146063B2

(12) United States Patent
Meurville et al.

(10) Patent No.: US 9,146,063 B2
(45) Date of Patent: Sep. 29, 2015

(54) MACHINE FOR DESCALING CELLULAR BODIES OF AN AIR-WATER HEAT EXCHANGER

(75) Inventors: Jean-Marc Meurville, Nailly (FR); Rémi Gomez, Paris (FR); Nicolas Laurent, Reims (FR); Thomas Majorel, Buzeins (FR); Michel Degrange, Paris (FR); Paule Blocbergen, Clermont-Ferrand (FR)

(73) Assignee: ARTS, Paris (FR)

( * ) Notice: Subject to any disclaimer, the term of this patent is extended or adjusted under 35 U.S.C. 154(b) by 450 days.

(21) Appl. No.: 13/501,033

(22) PCT Filed: Oct. 7, 2010

(86) PCT No.: PCT/EP2010/006134
§ 371 (c)(1),
(2), (4) Date: Oct. 24, 2012

(87) PCT Pub. No.: WO2011/042187
PCT Pub. Date: Apr. 14, 2011

(65) Prior Publication Data
US 2013/0047356 A1 Feb. 28, 2013

(30) Foreign Application Priority Data
Oct. 9, 2009 (FR) ..................................... 09 04835

(51) Int. Cl.
*F28G 1/14* (2006.01)
*F28G 1/12* (2006.01)
(Continued)

(52) U.S. Cl.
CPC ... *F28G 1/14* (2013.01); *F28C 1/00* (2013.01); *F28F 25/08* (2013.01); *F28G 1/02* (2013.01); *F28G 1/08* (2013.01); *F28G 1/10* (2013.01); *F28G 15/02* (2013.01); *F28G 15/04* (2013.01); *F28G 1/12* (2013.01)
(Continued)

(58) Field of Classification Search
CPC .................... B08B 9/04–9/0497; B08B 9/023; F28G 1/10; F28G 1/08; F28G 1/14; F28G 15/02; F28G 15/04; F28G 15/08; F28G 1/02; F28G 1/12; F28G 3/10; F28G 3/12; F28G 3/14; F28G 25/08; F22B 37/48; F23J 3/00; F23J 3/02; F23J 3/023; F23J 3/026
USPC ............... 15/104.03, 104.05, 104.02, 104.16, 15/93.1, 93.2; 29/81.01–81.17; 173/206, 173/207, 138, 212; 91/399, 400, 401, 409; 122/379, 381, 382, 387
See application file for complete search history.

(56) References Cited

U.S. PATENT DOCUMENTS

| 783,517 A * | 2/1905 | Greene ...................... 15/104.07 |
| 1,037,033 A * | 8/1912 | Mauss ............................. 60/698 |

(Continued)

FOREIGN PATENT DOCUMENTS

| EP | 2 096 395 A1 | 9/2009 |
| FR | 2 903 178 A1 | 1/2008 |
| WO | WO 2005/107970 A1 | 11/2005 |

*Primary Examiner* — Mark Spisich
*Assistant Examiner* — Andrew A Horton
(74) *Attorney, Agent, or Firm* — Muncy, Geissler, Olds & Lowe, P.C.

(57) ABSTRACT

The invention relates to a machine for descaling cells (3) of a cellular runoff body (2) used in an air-water exchanger, characterized in that it comprises at least one tool (6, 7) having an active tip (6a, 7a) and mounted on a frame (1) so as to be mobile between two positions in one direction common to all of the tools (6, 7) supported by the frame (1), the active tip (6a, 7a) of said tool being supported by the end of a rod (13) of a cylinder (11), the body (12) of which is mounted so as to be mobile relative to the frame (1) along the axis thereof, a piston (23) rigidly connected to the rod (13) and defining, in the body, a first chamber (26) which is constantly connected to a source of pressurized fluid and to a second chamber (27) through which the rod (13) passes, is in communication with the first chamber (26) as long as the rod (13) is at least partially retracted into the cylinder body (12) and insulated from the latter, and is connected to the exhaust when the rod (13) is in an end extension position outside the body (12).

10 Claims, 1 Drawing Sheet

(51) Int. Cl.

| | | |
|---|---|---|
| *F28G 1/02* | (2006.01) | |
| *F28G 1/08* | (2006.01) | |
| *F28G 1/10* | (2006.01) | |
| *F28G 15/02* | (2006.01) | |
| *F28G 15/04* | (2006.01) | |
| *F28C 1/00* | (2006.01) | |
| *F28F 25/08* | (2006.01) | |

(56) References Cited

U.S. PATENT DOCUMENTS

| | | | |
|---|---|---|---|
| 1,339,098 A * | 5/1920 | Burlingham | 15/104.07 |
| 3,869,747 A * | 3/1975 | Richter | 15/104.095 |
| 3,938,535 A | 2/1976 | Cradeur et al. | |
| 4,015,304 A * | 4/1977 | Dillinger | 15/104.095 |
| 4,137,928 A * | 2/1979 | Sentell | 134/167 C |
| 4,194,258 A * | 3/1980 | Dillinger | 15/104.095 |
| 4,605,028 A * | 8/1986 | Paseman | 134/167 C |
| 5,010,908 A * | 4/1991 | McLeod et al. | 134/168 C |
| 5,072,788 A * | 12/1991 | Goodwin et al. | 165/95 |
| 5,251,367 A * | 10/1993 | Ward et al. | 29/81.15 |
| 5,964,243 A * | 10/1999 | Watt | 137/244 |
| 6,408,936 B2 * | 6/2002 | Duran | 165/94 |
| 6,865,766 B2 * | 3/2005 | Pettersson | 15/104.05 |
| 6,988,468 B2 * | 1/2006 | Higgins et al. | 122/387 |
| 2007/0089253 A1 * | 4/2007 | Mayer | 15/104.09 |

* cited by examiner

US 9,146,063 B2

MACHINE FOR DESCALING CELLULAR BODIES OF AN AIR-WATER HEAT EXCHANGER

REFERENCE TO RELATED APPLICATIONS

This application is a 371 of PCT/EP2010/006134, filed on Oct. 7, 2010, and claims the benefit of French application No. 09 04835, filed on Oct. 9, 2009.

The present invention relates to air and water heat exchangers such as those employed, for example, in a cooling tower and more particularly to the cleaning of trickling surfaces.

BACKGROUND OF THE INVENTION

In cooling towers, water, for example from a secondary condensation circuit, is mainly cooled by vaporizing a fraction of the water to be cooled which trickles over surfaces which are provided for this purpose and over which a stream of air flows in the opposite direction to the trickling direction, and secondly during the convection which takes place on the heat exchange surfaces in the water itself.

These surfaces are carried by a heat exchange body, commonly called "packing", formed by sheets which are usually made from PVC but are sometimes metal, assembled together to form a cellular structure. Each cell of this structure takes the form of a tube approximately 1.5 meters long, the average dimension of its cross section being a few centimeters. The wall of the cells is thin (a few tenths of a millimeter) and may be pierced with a large number of orifices. The heat exchange bodies are suspended in the cooling tower between a unit for spraying the water to be cooled and a lower trough for collecting the cooled water.

Catching means are arranged in the upper part of the tower for retaining, as much as possible, the droplets of water carried by the cooling air. Indeed, it is important not to emit this water into the atmosphere as it contains germs which may have proliferated in the tower where the temperature favors such proliferation.

During use, the heat exchange body becomes loaded with a deposit of mineral salts (scale) because of the evaporation that occurs on the trickling surfaces. This deposit increases over time and may represent as much as ten times the weight of the body itself in some installations.

There are many disadvantages of this deposit: it obstructs the trickling and hence affects the efficiency of the heat exchange; various germs in the water can collect there in an environment that is favorable to their proliferation; it applies a very significant extra load on the support structure for the heat exchange body which is generally suspended inside the tower, etc.

There are, at least in theory, many means of overcoming this disadvantage.

One of these consists in chemically treating the water to be cooled to remove salts from it and hence prevent the heat exchange surfaces from scaling up. This method cannot be considered for cooling towers of electricity-generating, thermal, or nuclear power stations.

The scale can also be dissolved chemically using suitable solutions. This approach entails the awkward problem of treating the effluents, which has economic consequences for the cost of the operation.

It may be envisaged to shake the heat exchange body using any suitable mechanical means; although this method has been tested, it damages the heat exchange body, making it virtually unusable subsequently.

Lastly, this heat exchange body may be mechanically cleaned after it has been disassembled; this is an extremely expensive operation given the large size of this body (10 to 12,000 cubic meters in units of approximately two cubic meters).

FR 2.903.178 discloses a method and a machine which makes it possible to avoid the disadvantages of the existing or foreseeable solutions in order to clean the heat exchange bodies employed in air-cooling towers of electricity-generating power stations, in particular nuclear power stations.

SUMMARY OF THE INVENTION

The invention proposes an alternative solution to that described in the abovementioned document, by virtue of which it can be ensured that a treated cell is no longer covered with scale or has just an acceptable quantity of residual scale.

The subject of the invention is thus a machine for descaling the cells of a cellular trickling-water body employed in an air and water heat exchanger which has at least one tool with an active tip and is mounted so that it can move on a frame between two positions in a direction shared by all the tools carried by the frame, the active tip of this tool being carried by the end of an actuator rod, the body of which is mounted so that it can move relative to the frame along its axis, a piston integral with the rod defining in the body a first chamber permanently connected to a source of pressurized fluid, and a second chamber through which the rod passes and which is in communication with the first chamber as long as the rod is at least partially retracted into the body of the actuator and isolated from the latter and in communication with the atmosphere (or any fluid collection tank if the fluid is not air) when the rod is in its furthest extended position outside the body.

The active tip of the tool takes the form of a treated steel end piece with dimensions that match those of the cells such that, if the walls of the cells are made from steel, each end piece acts as a member for scraping off the scale, whereas, if the walls of the cells are made from plastic (PVC), the end piece causes a local expansion of the cell which causes the scale to crack and break off.

The above design of each tool makes it possible to preserve the relatively fragile structure of the packing and not destroy it. Indeed, when the tool is being used, each rod is maximally extended relative to the body of the actuator. In this state, the force applied to the tool (to penetrate the cell) is equal and limited to the pressure of the source multiplied by the cross section of the first chamber. It is therefore sufficient to set the pressure to a value that keeps this force below an acceptable value in order to prevent damage to the packing in the event of a blockage. If the resistance to penetration is greater than this force, the rod is retracted into the body of the actuator and brings the two chambers of the actuator into communication. At this time, the pressure is established in the second chamber and the force applying the tool falls to a value equal to the pressure multiplied by the difference in the cross sections of the first and second chambers. All other things being equal, the ratio of the diameters of the rod and the piston forms the division factor for the force applying the tool to the packing. This arrangement allows a plurality of tools to be mounted on the same movable frame, each tool continuing to work or being deactivated depending on the resistance it encounters when it penetrates the cell which it is intended to treat.

In a particular embodiment of each tool, communication between the first and second chambers of each actuator is effected by a clearance between the body of the actuator and the piston.

An alternative embodiment provides a permanent leak between the body of the actuator and the rod so that the second chamber is connected to the atmosphere by this leak. Of course, the leak in question has a cross section which is much smaller than the clearance around the piston so that the pressure of the source can be established in the second chamber. In this case, when the rod is maximally extended, the piston isolates the second chamber from the leak around the rod by means of a seal with which it is provided and which, in this maximally extended state, is in contact with the base of the body of the actuator through which the rod passes.

According to one structural feature, each actuator body is movably connected with respect to the frame by means of a carriage mounted so as to slide on the frame in the direction parallel to the axis of the actuator, the connection between the carriage and the actuator body being elastically extendable along this axis over a specified and self-adjusting amplitude in a plane perpendicular to this direction.

In a particular embodiment, the abovementioned connection has a plurality of inelastic and deformable upper and lower links forming stays between the carriage and the body of each actuator, the length of the links being such that, when the upper links are straight, the lower links are bent and vice versa, the break points of the links being joined by elastic members which effect the suspension with a specified degree of tension in the links. The links are either cables or levers articulated together at the break point and respectively to the body of the actuator and to the frame at their free ends.

Lastly, each actuator rod is guided relative to the frame by means of a guide integrally connected to the frame by means of a self-adjusting connection in a plane perpendicular to the axis of the rod.

Other features and advantages of the invention will become apparent from the description given below of an exemplary embodiment of the invention.

BRIEF DESCRIPTION OF THE DRAWINGS

Reference will be made to the attached drawings, in which.

DETAILED DESCRIPTION OF THE INVENTION

Figure 1:
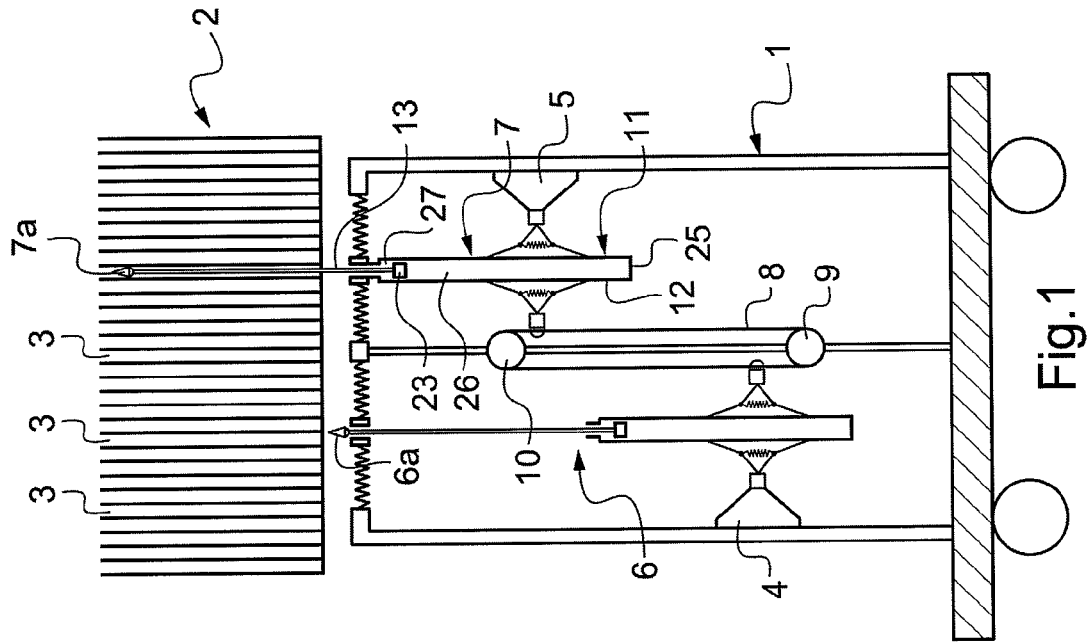
FIG. 1 shows a skeleton diagram of a machine according to the invention.

A machine frame 1 is shown in FIG. 1 which can be displaced beneath a trickling-water heat exchange body which comprises a plurality of adjacent cells to clean off the scale deposit which covers their walls. This frame forms the support for two carriages 4 and 5 mounted so that they can slide vertically in the frame 1. These carriages each carry a series of descaling needles 6, 7 (only one needle of each series can be seen in the figure).

It may be understood from this figure that when a carriage 4, 5 rises along the frame 1, the needles that it carries are inserted into a cell. Each needle has a treated-steel tip 6a, 7a with dimensions and a shape that match the dimensions of the cell to be treated and the material of the walls. The tip of each needle will thus have a relatively ogival shape to cause an expansion of the cell which it penetrates when the latter is made from plastic which can withstand deformation causing the scale to crack and break off. This tip will instead have the form of a scraper if the cell wall is metal, cannot deform much and from which the scale is broken off by scraping rather than deformation.

In the case of the diagram, the rising and falling movements of the carriages are controlled by means of a centralized drive system, here represented by a chain or belt 8 to which each carriage is connected and which is wound around two wheels or pulleys 9 and 10, one of which is motorized.

Within this general architecture, the machine according to the invention has particular points which will become apparent from the following figures.

Figure 2:
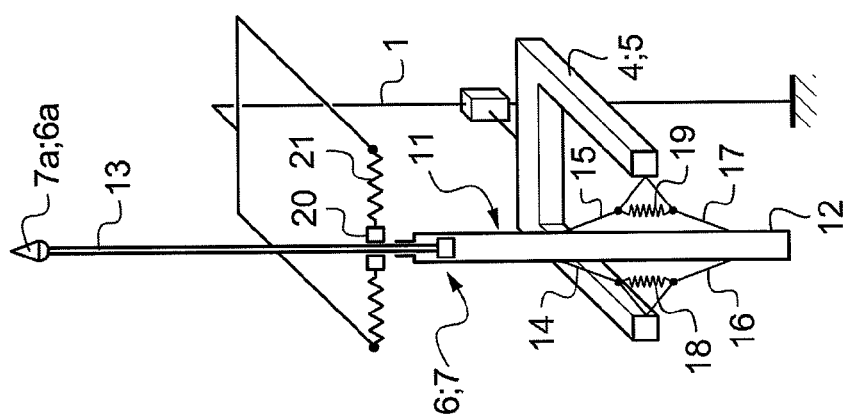
FIG. 2 is a detailed diagram of FIG. 1.

In FIG. 2, some of the elements already described are shown with the same reference numerals. The needle 6 is in the form of an actuator 11 for reasons which will be explained below. The body 12 of this actuator is attached to the carriage 4 by a suspension system which has a compliance permitting the needle to "find its own way", in other words to be displaced laterally if the tip that it carries is not absolutely centered relative to the cell which it is to penetrate. This compliance is achieved for the connection of the body 12 of the actuator 11 to the carriage 4 and for the guidance of the rod 13 of this actuator which forms the needle proper, equipped at the end with the abovementioned tip 6a.

The connection of the body 12 to the carriage 4 has upper links, in this case two cables 14 and 15, and two lower links, the cables 16 and 17. The cables cannot be extended and their length is such that, when the upper or lower cables are tensioned, the lower or upper cables are relaxed, which permits a vertical movement between the actuator 11 and the carriage 4. The amplitude of this movement depends on the excess length of the cables compared with their length which would make this relative movement impossible, all other things being equal. The connection also has elastic members 18 and 19 which extend between an upper and lower cable of a pair of cables, attached to the latter at points which break up each cable into two tensioned sections. Each needle is thus suspended elastically from the carriage such that it can move laterally with respect to the frame until the cables opposing the direction of the movement are tensioned and limit the amplitude of this movement, and can move vertically until the cables opposing the direction of the movement are also tensioned.

Moreover, the part of the needle formed by the rod 13 of the actuator 11, extending outside the body 12 of this actuator, is guided by a sort of bearing 20 which is itself held by an elastic connection 21 to the frame 1. The needle is therefore capable of a certain degree of lateral motion relative to this frame.

This form of assembly therefore enables the needle to penetrate the cell toward which it can be deflected. When the resistance to penetration of the cell is greater than the elastic return force of the needle/carriage connection, the cables 16 and 17 are tensioned and the needle is forced to move upward as long as the resistant force has not reached a critical value, as will be explained below. In the same way, if the needle is held back by a high degree of friction when it moves downward, the cables 14 and 15 are tensioned and the force of the descending carriage is transmitted directly to the needle which is inevitably extracted from the cell.

In an alternative embodiment which is not shown, the cables are replaced by levers which are articulated together at the anchoring point for the spring 18, 19 and by their free end on the body 12 and on the carriage 4. It will be noted that there may be more cables or levers than the two pairs shown, evenly distributed around the needle.

Figure 3:
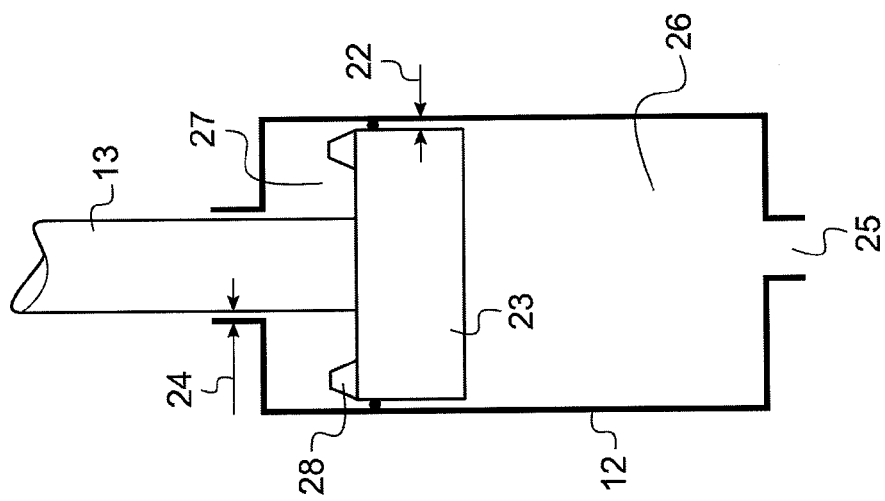
FIG. 3 is a diagram of a particular embodiment of the descaling needle.

FIG. 3 illustrates the structure of a descaling needle employed in the invention. The body 12 of the actuator contains, with a calibrated clearance 22, a piston 23 integral with the rod 13. This rod 13 passes, with a calibrated clearance 24, through a base of the body 12 of the actuator 11, whereas the opposite base permanently communicates with a source of pressurized fluid, preferably air, via a supply orifice 25.

The piston 23 therefore divides the internal volume of the body of the actuator into two chambers 26 and 27 which communicate via the clearance 22. The ratio of the diameters of the rod and the piston is such that the effective surface area of the piston in the chamber 27 which contains the rod is about 70 to 80% of the effective surface area that the piston offers to the pressure prevailing in the chamber 26. The chamber 27 communicates with the outside atmosphere via the clearance 24.

The upper face of the piston 23 is equipped with a seal 28 at its periphery, around the rod 13. When the rod is maximally extended, the seal 28 is applied against the inner face of the end of the body 12 of the actuator 11. The part of the chamber 27 that surrounds the rod, inside the seal, is at atmospheric pressure.

The fluid admitted into the chamber 26 is at a pressure P called the setting pressure. Under the action of this pressure and in spite of the leak around the piston 23, the rod reaches its maximum extension outside the body and the piston is applied against the base of the body on the seal 28. The force that keeps the rod extended is thus P×S, where S is the smaller surface area of the piston 23.

During operation, the needle in this extended position is inserted into a cell 3 by the carriage 4, 5. If the resistance to insertion is high, the elastic connection described with reference to FIG. 2 is deformed until the cables 16 and 17 are tensioned. Then, when the resistant force exceeds P×S, the piston 23 lifts off from the base of the actuator body and the chamber 27 is in communication with the chamber 26. The pressure P is rapidly established in the chamber 26 and the force which continues to be applied to the rod 13 tending to extend it is reduced to 0.2 or 0.3 times the value P×S. In these conditions, the rod is inserted into the body of the actuator instead of being forced toward the packing. The risk of damaging the latter is thus eliminated, especially if the value P of the pressure is adjusted depending on the fragility of the walls of the cells. The other needles carried by the carriage can thus continue to work normally. The clearances 22 and 24 are adapted to the operating speed of the device. The clearance 24 will have a smaller cross section than the clearance 22 so that the pressure P is rapidly established in the chamber 27 and the needle is rapidly deactivated, whereas the needle-carrying carriage continues its travel.

The invention claimed is:

1. A machine for descaling the cells of a cellular trickling-water body employed in an air and water heat exchanger, the cells having a longitudinal direction, the machine comprising at least one tool, with an active tip, mounted so that the at least one tool can move on a frame between two positions in the longitudinal direction, the active tip being carried by an end of a rod, a body of an actuator being mounted so that it can move relative to the frame along a longitudinal axis of the rod, a piston integral with the rod defining in the body a first chamber permanently connected to a source of pressurized fluid, and a second chamber through which the rod passes and which is in fluidic communication with the first chamber as long as the rod is at least partially retracted into the body of the actuator and isolated from the latter and connected to an outlet when the rod is in its furthest extended position outside the body,
   wherein the body of the actuator is movably connected with respect to the frame by means of a carriage mounted so as to slide on the frame in a direction parallel to the axis of the actuator, the connection between the carriage and the actuator body being elastically extendable along this axis over a specified and self-adjusting amplitude in a plane perpendicular to this direction, and
   wherein the abovementioned connection has a plurality of inelastic and deformable upper and lower links forming stays between the carriage and the body of each actuator, the length of the links being such that, when the upper links are straight, the lower links are bent and vice versa, the break points of the links being joined by elastic members which effect the suspension of a needle on the carriage with a specified degree of tension in the links.

2. The descaling machine as claimed in claim 1, wherein communication between the first and second chambers of each actuator is effected by a clearance between the body of the actuator and the piston.

3. The descaling machine as claimed in claim 2, wherein a permanent leak is created between the body of the actuator and the rod so that the second chamber is connected to the outlet by this leak.

4. The descaling machine as claimed in claim 3, wherein the cross section of the abovementioned leak is much less than the abovementioned clearance between the body and the piston so that the pressure (P) of the source can be established in the second chamber.

5. The descaling machine as claimed in claim 4, wherein the piston isolates the second chamber from the leak around the rod by means of a seal with which it is provided and which, in the maximally extended state of the rod, is in contact with the base of the body of the actuator through which the rod passes.

6. The descaling machine as claimed in claim 1, wherein the links are cables.

7. The descaling machine as claimed in claim 1, wherein the links are levers articulated together at the break point and respectively at the body of the actuator and at the frame at their free ends.

8. The descaling machine as claimed in one of the preceding claims, wherein each actuator rod is guided relative to the frame by means of a guide integral with the frame having a self-adjusting connection in a plane perpendicular to the axis of the rod.

9. The descaling machine as claimed in claim 1, wherein the rod is arranged to be inserted into the body of the actuator when a resistance force applied to the tool exceeds a threshold.

10. The descaling machine as claimed in claim 1, wherein the active tip causes a local expansion of the cell.

* * * * *